Dec. 12, 1933.     M. A. BARBER     1,939,485

APPARATUS FOR AUTOMATIC TRAIN PIPE CONNECTERS

Filed June 17, 1929

Inventor

Martin A. Barber

By Bates, Goldrick & Tease

Attorney

Patented Dec. 12, 1933

1,939,485

UNITED STATES PATENT OFFICE 1,939,485

APPARATUS FOR AUTOMATIC TRAIN PIPE CONNECTERS

Martin A. Barber, Cleveland, Ohio, assignor to Consolidated Connector Patent Corporation, Wilmington, Del.

Application June 17, 1929. Serial No. 371,652

1 Claim. (Cl. 285—58)

This invention relates to automatic train pipe connecters and particularly to devices for holding a train pipe nipple in adjusted position with reference to the connecter head. In practice, such nipple is mounted at the free end of a short length of hose which is usually threaded onto the end of a train pipe. The connection between the nipple and head is intended to permit removal of the nipple from the rear part of the head so as to permit the replacement of a gasket while the heads remain coupled. A form of connection, which has been used for holding the nipple in contact with the head, has been a pin which extends through registering apertures in the nipple and head. Due to the threaded connection between the hose and the train pipe, it has been difficult to control the registration of such locking apertures, hence in many cases, it has been necessary to twist the hose to effect proper registration. Obviously, this is a difficult operation, as the trainman must work in a restricted space and can only use one hand to twist the hose while the other is used to drive home the locking pin.

The locking pin, which has been principally used, has been a tapered member which extends vertically through apertures and which has been held by gravity in the proper position. Such locking pins usually become rusted however, after they have been exposed to the elements and can only be removed with the use of tools at the expense of considerable time and labor, as the pins are mounted in a position to which access may be had only with considerable difficulty.

The principal object of my invention is to make a connection, between a fluid carrying nipple and an automatic train pipe connecter head, which will enable the hose to be tightened as much as possible to the train pipe and then to be readily attached to the connecter head, without requiring it to be twisted to bring it to the proper posi-ion for enabling the locking operation to be made.

My invention also contemplates the provision of a locking device which will enable the trainmen to lock the nipple to the head in an expeditious manner without requiring the use of wrenches or other tools to make or break the connection.

Figure 1:
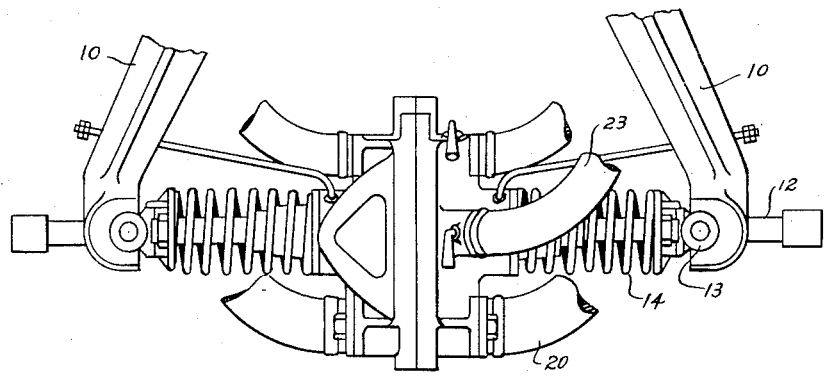
Figure 2:
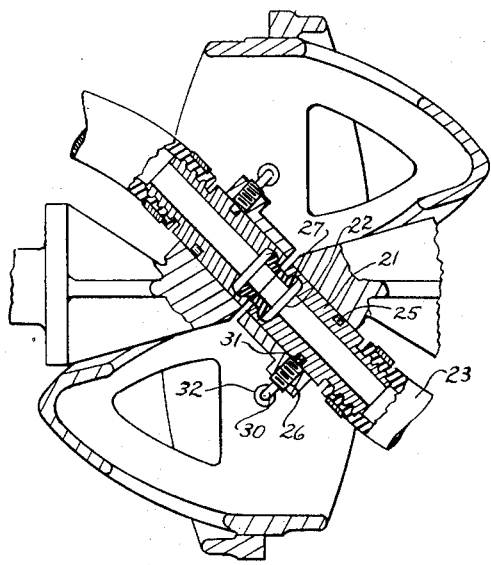
Figure 3:
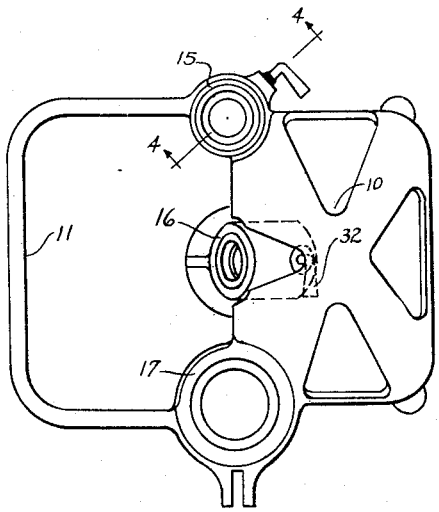
Figure 4:
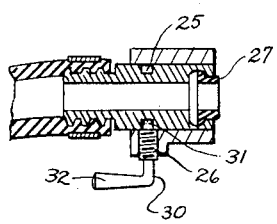

Referring now to the drawing, Fig. 1 is a side elevation of a pair of automatic train pipe connecters embodying my invention; Fig. 2 is a horizontal section through the connecter heads shown in Fig. 1; Fig. 3 is a front view of one of the disconnected heads, and Fig. 4 is a section taken on the line 4—4 in Fig. 3.

In Fig. 1, I have shown two automatic train pipe connecters in coupled position, and as being supported by brackets 10, which normally are attached to and are arranged to depend from the train pipe couplers. Each connecter head has a projection 10 and a recess 11 which coact with a similar recess and projection on the connecter head of an adjacent car. Each head is shown as having a shank 12, extending rearwardly therefrom, and as being connected by a universal joint 13 to the lower end of the bracket. A spring 14 is illustrated as surrounding the shank and as extending between the head and universal joint, for normally urging the head forwardly of the bracket, and for holding it in connected position in the usual way.

Each head is also shown, as having ports 15, 16 and 17 for the air signal, air brake, and steam conduits respectively. Such conduits usually comprise short lengths of hose, each of which has a nipple at the free end thereof, and which is attached at the opposite end to the train pipe 35 by a screw thread connection not shown. As the steam pipe hose 20 is ordinarily fastened by bolts to the connecter head, it is only necessary to equip the air brake and air signal conduits with my invention. To this end, Fig. 2 shows each head as having a nipple 21 extending therethrough and obliquely to the longitudinal axis of the connecter, and as having a gasket 22 mounted at the free end thereof. The other end of the nipple is attached to a hose 23 in the usual way.

To lock the nipple to the head, without requiring the hose to be twisted, I provide an annular groove 25 in the nipple in substantial registration with a threaded passageway 26 in the connecter head. The passageway is so located with reference to the groove that the forward end of the gasket projects slightly beyond the face 27 of the head, so as to insure a slight compression of the gaskets when the heads are coupled. A manually operable locking member 30 has a portion thereof threaded to coact with the threads in the passageway 26, and has a reduced portion 31 at the free end, which acts as a pilot to force the nipple 21 into locking position, and then serves to hold it in such position. The opposite end of the member 30 may be bent as at 32, to provide a handle. The weight of the handle under the action of gravity, normally tends to prevent the member from becoming loosened, notwithstanding excessive vibration to which the connecter might be subjected while in use.

From the foregoing description, it will be evident that the present invention enables a gasket to be readily placed on a connecter, without necessitating the use of wrenches or other tools, and it will also be evident that my invention permits gasket carrying nipples to be effectively locked in place after the hose has been threaded tightly onto the train pipe. Thus leakage at the connection between the hose and pipe is avoided, and provision is made for enabling a trainman to connect the free end of the hose to the connecter head in an expeditious manner.

I claim:

In combination, an automatic train pipe connecter head having a rectilinear passageway extending rearwardly thereof, a train pipe hose adapted to be in threaded engagement at one end thereof with a train pipe, and having a nipple rigidly attached to the other end thereof, the nipple having a shoulder extending around the outer surface thereof, the head having a threaded opening extending therethrough in a direction normal to the axis of said passageway, and an L-shaped member having one arm thereof in threaded engagement with the aperture, and having the inner end thereof adapted to engage the shoulder for locking the nipple to the head, said member having the other arm thereof weighted, whereby it is held in locking position by the action of gravity while the car to which the connecter is attached is in motion, said member and shoulder operating to effect a locking action between the nipple and head without requiring the hose to be twisted for insertion of the nipple in the passageway, regardless of the angular position of the hose with reference to the train pipe, and said member operating to admit the nipple into a passageway solely by a rectilinear movement thereof through the head.

MARTIN A. BARBER.